US007400948B2

(12) United States Patent
Sumcad et al.

(10) Patent No.: US 7,400,948 B2
(45) Date of Patent: Jul. 15, 2008

(54) PROVIDING SERVICES WITHIN A TELEMATICS COMMUNICATION SYSTEM

(75) Inventors: Anthony J. Sumcad, Southfield, MI (US); James Bicego, Lake Orion, MI (US); Hitan S. Kamdar, Utica, MI (US)

(73) Assignee: General Motors Corporation, Detroit, MI (US)

( * ) Notice: Subject to any disclaimer, the term of this patent is extended or adjusted under 35 U.S.C. 154(b) by 878 days.

(21) Appl. No.: 10/929,985

(22) Filed: Aug. 30, 2004

(65) Prior Publication Data

US 2006/0047373 A1 Mar. 2, 2006

(51) Int. Cl.
*G06F 17/00* (2006.01)

(52) U.S. Cl. ............................ 701/1; 701/36; 455/440; 455/574; 455/460; 455/414.1

(58) Field of Classification Search ..................... 701/1, 701/36, 24; 455/466, 574, 440, 414.1
See application file for complete search history.

(56) References Cited

U.S. PATENT DOCUMENTS 5,408,520 A * 4/1995 Clark et al. .............. 379/93.07
2003/0168844 A1 9/2003 Borroni-Bird et al.
2003/0185162 A1 10/2003 Fraser et al.
2003/0232619 A1* 12/2003 Fraser ........................ 455/420

OTHER PUBLICATIONS

Kelly Carroll, Data to ride shotgun: InfoMove helps connect cars to Internet, Telephony Dec. 13, 1999, Copyright 1999 by Primedia Business Magazines & Media Inc., "All Rights Reserved", Telephony, Spectrum; ISSN: 0040-2656, 1091 words.

Seattle, InfoMove Delivers New Generation of Wireless Internet Services for the Car, Business Wire, Oct. 18, 1999, Copyright 1999 Business Wire, Inc. Business Wire, Business Editors/Technology Writers, 994 words.

Bob Low, Motoring in the new millennium on the Net, Daily Record, May 1, 1998, Copyright 1998 Scottish Daily Record & Sunday Mail Ltd., Daily Record May 1, 1998, Friday, p. 31 Road, 734 words.

(Continued)

*Primary Examiner*—Khoi H. Tran
*Assistant Examiner*—Marie A Weiskopf

(57) ABSTRACT

The present invention provides a method of operating a telematics enabled mobile vehicle communication system. The method includes receiving a vehicle power down signal that includes vehicle identification information and time information of vehicle power down from a telematics device to a service provider. The method further includes initiating a vehicle power down count down at the service provider responsive to the receipt of the vehicle power down signal and estimating a remaining vehicle connection availability window based on the vehicle power down count down. The method additionally includes populating an advisor application with an estimated remaining vehicle connection availability window that is based on the vehicle power down count down. The method may further include generating the vehicle power down signal with the telematics device when a power down mode in an associated motor vehicle is detected and communicating the generated vehicle power down signal to the service provider.

19 Claims, 3 Drawing Sheets

OTHER PUBLICATIONS

Tarre Beach, New Products; Sidebar, Wireless Review Apr. 1, 2000, Copyright 2000 by Primedia Business Magazines & Media Inc., "All rights Reserved" Wireless Review, Apr. 1, 2000, New Products; ISSN: 1099-9248, 351 words.

Flint, Mich., Jan. 3, BUIC XP2000—A Concept Cat For The 21ST Century, PR Newswire, Jan. 3, 1995, Copyright 1995 PR Newswire Association, Inc. PR Newswire, Jan. 3, 1995, Tuesday, Financial News, (With Photo) To Business and Auto Editors, 2149 words.

U.S. Appl. No. 10/212,957, filed Aug. 6, 2002, Fraser et al.

U.S. Appl. No. 10/837,935, filed May 3, 2004, Oesterling et al.

* cited by examiner

PROVIDING SERVICES WITHIN A TELEMATICS COMMUNICATION SYSTEM

FIELD OF THE INVENTION

This invention relates generally to wireless communications. More specifically, the invention relates to a method and system for operating a telematics enabled mobile vehicle communication system.

BACKGROUND OF THE INVENTION

The opportunity to utilize wireless features is ever increasing as cellular transceivers are being transformed into entertainment as well as communication platforms. One such cellular transceiver is a wireless feature included within wireless vehicle communication and networking services for a mobile vehicle. Another such cellular transceiver includes capabilities to receive satellite broadcasts such as, for example, Global Positioning System (GPS) signals and satellite radio signals.

Typically, wireless systems within mobile vehicles (e.g., telematics units) provide voice communication. These wireless systems have also been utilized to update systems within telematics units such as, for example, radio station presets. Additionally, these wireless systems have also been utilized to send data to service providers, such as, sensor data to assist the mobile vehicle manufacturer in maintaining the mobile vehicle.

Recently, services have been expanded to include emergency services, roadside assistance, and the like. Unfortunately, there are limitations to some of the services offered, such as, the ability to instantaneously unlock a user's vehicle due to the telematics equipped mobile vehicle operating in a stand-by mode or discontinuous receive state.

The present invention advances the state operating a telematics enabled mobile vehicle communication system.

SUMMARY OF THE INVENTION

One aspect of the invention includes a method of operating a telematics enabled mobile vehicle communication system. The method includes receiving a vehicle power down signal including vehicle identification information and time information of vehicle power down from a telematics device to a service provider. The method further includes initiating a vehicle power down count down at the service provider responsive to the receipt of the vehicle power down signal and estimating a remaining vehicle connection availability window based on the vehicle power down count down. The method additionally includes populating an advisor application with an estimated remaining vehicle connection availability window that is based on the vehicle power down count down.

In accordance with another aspect of the invention, a computer readable medium storing a computer program for operating a telematics enabled mobile vehicle communication system includes: computer readable code for providing a received vehicle power down signal including vehicle identification information and time information of vehicle power down from a telematics device to a service provider; computer readable code for initiating a vehicle power down count down at the service provider responsive to the receipt of the vehicle power down signal; computer readable code for estimating a remaining vehicle connection availability window based on the vehicle power down count down; and computer readable code for populating an advisor application with an estimated remaining vehicle connection availability window that is based on the vehicle power down count down.

In accordance with yet another aspect of the invention, a telematics enabled mobile vehicle communication system is provided. The system includes means for receiving a vehicle power down signal including vehicle identification information and time information of vehicle power down from a telematics device to a service provider. The system additionally includes means for initiating a vehicle power down count down at the service provider responsive to the receipt of the vehicle power down signal. Means for estimating a remaining vehicle connection availability window based on the vehicle power down count down is provided. Means for populating an advisor application with an estimated remaining vehicle connection availability window that is based on the vehicle power down count down is also provided.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
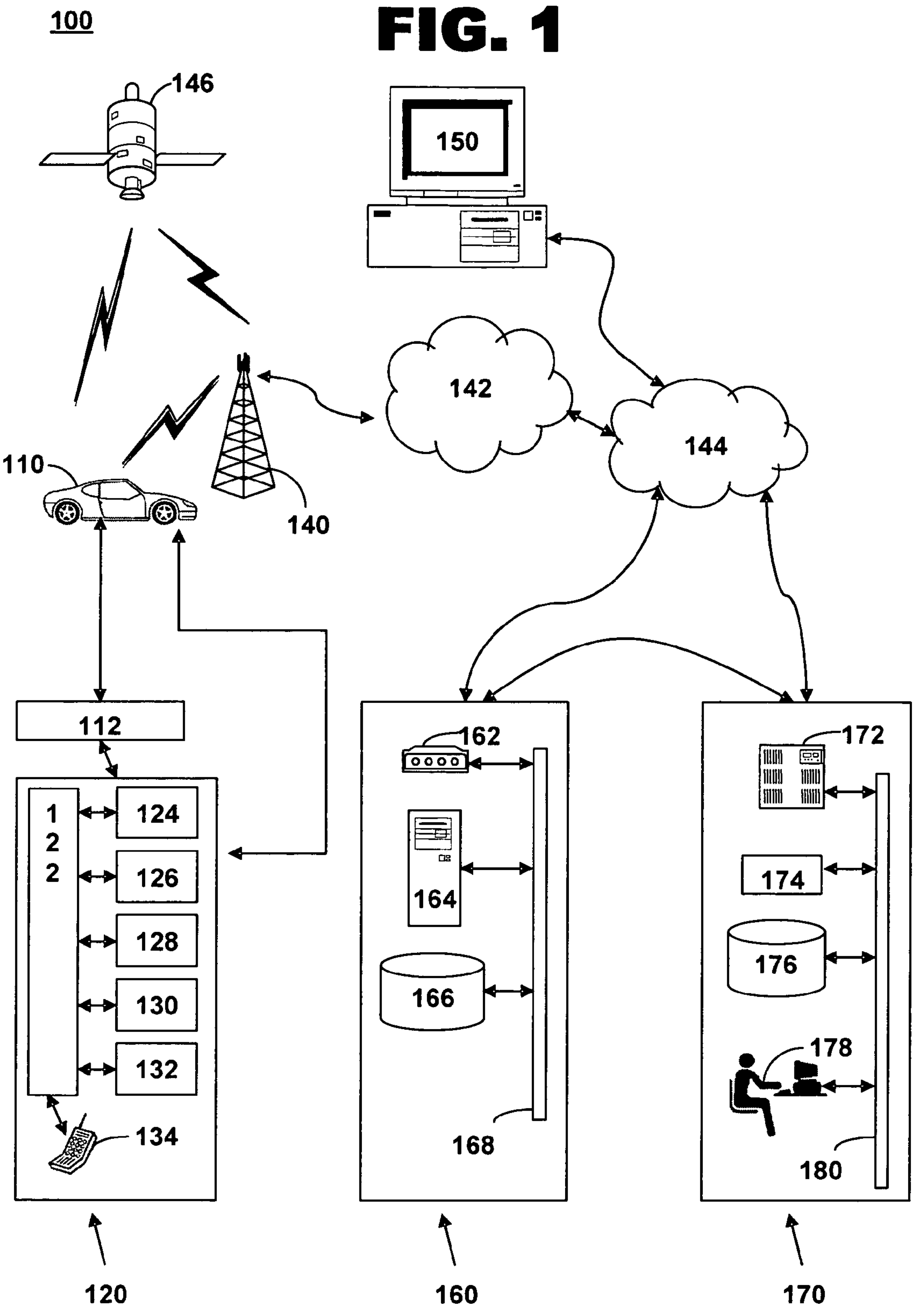
FIG. 1 illustrates an operating environment for implementing wireless communication within a mobile vehicle communication system.

FIG. 1 illustrates one embodiment of an operating environment for implementing wireless communication within a mobile vehicle communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, controller, digital signal processor (DSP), host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). GPS unit 126 additionally provides time information based on the received GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In yet another embodiment, broadcast services include various generically formatted data packets regularly transmitted by satellite broadcast system 146. In an example, generically formatted data packets such as, for example, pseudo-random code received by telematics unit 120, are processed by processor 122. In this example, pseudo-random code received by telematics unit 120 is processed into GPS coordinates by processor 122, such as by trilateration, and provided to telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In one embodiment, a client utilizes computer 150 to provide radio station presets as user preferences for MVCU 110. In an example, user-preference data from client-side software is transmitted to server-side software of web-hosting portal 160.

In this example, user-preference data is stored at web-hosting portal 160. In another example, user-preference data from client-side software is transmitted to server-side software of web-hosting portal 160. In this example, user-preference data is stored at web-hosting portal 160 and later transmitted to MVCU 110 via wireless carrier system 140 or satellite broadcast system 146. In another example, user-preference data is transmitted directly to MVCU 110 via wireless carrier system 140 or satellite broadcast system 146.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example roadside assistance, vehicle updates, and the like to telematics unit 120 in MVCU 110 through wireless carrier system 140, communication network 142, land network 144, satellite broadcast system 146, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through satellite broadcast system 146, communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
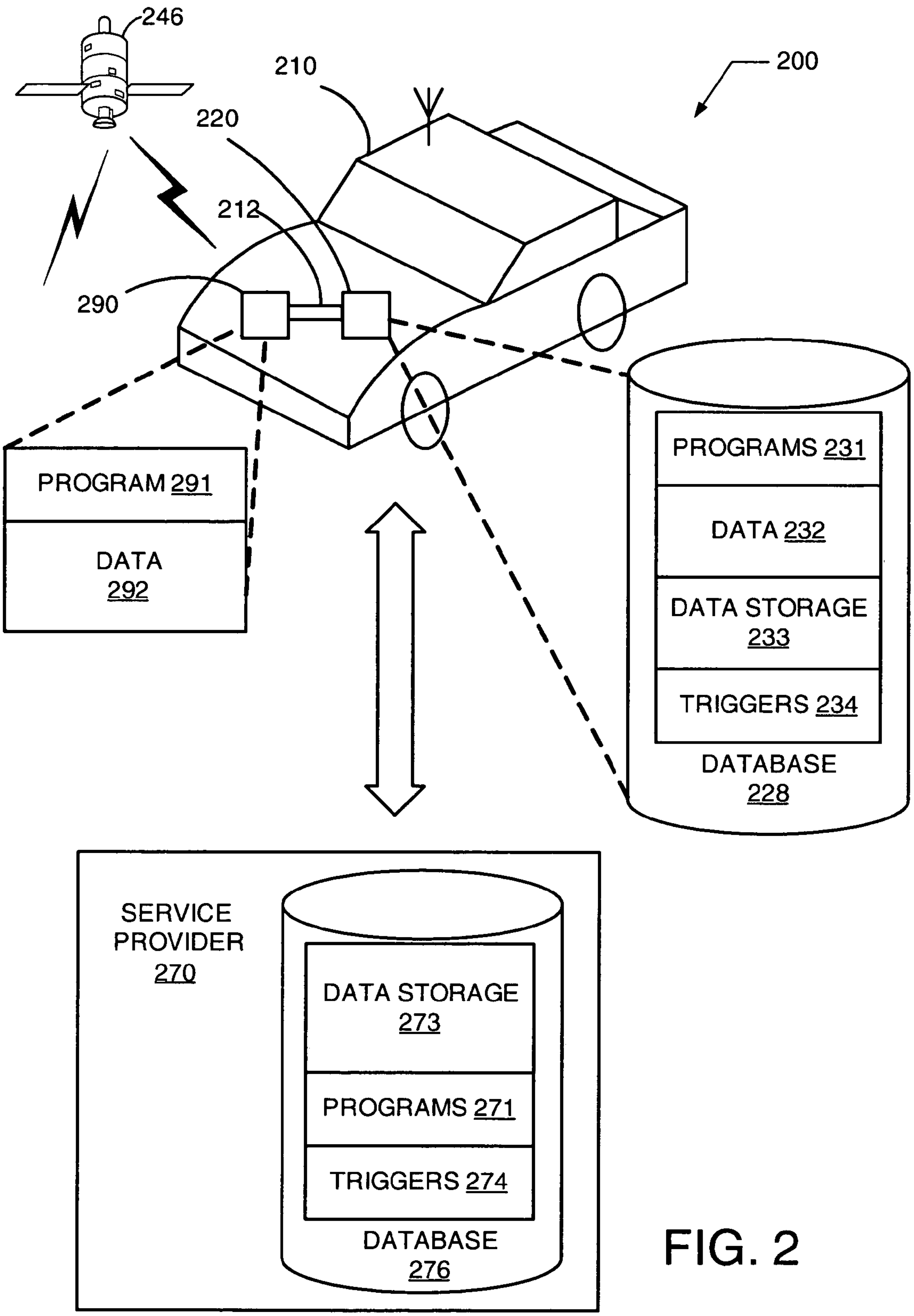
FIG. 2 is a block diagram of a telematics-based system in accordance with an embodiment of the present invention.

FIG. 2 is a block diagram of a telematics-based system in accordance with an embodiment of the present invention. FIG. 2 shows a telematics-based system 200 for operating a vehicle telematics device as a satellite signal receiver.

In FIG. 2, the telematics-based system 200 includes a mobile vehicle 210, satellite broadcast system 246, and a service provider 270. Mobile vehicle 210 includes a telematics unit 220 coupled to one or more vehicle system modules 290 via a vehicle communication network 212. Telematics unit 220 further includes a database 228 that contains programs 231, program data 232, data storage 233, and triggers 234. Vehicle system module (VSM) 290 is included within mobile vehicle 210 and further includes a program 291 and data 292. In one embodiment, VSM 290 within mobile vehicle 210 is located within telematics unit 220. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider such as, for example, telematics unit 120 as described with reference to FIG. 1. Telematics unit 220 in vehicle 210 is in communication with a service provider (e.g., a "service center"). Telematics unit 220 includes volatile and non-volatile memory components for storing data and programs. In one embodiment, memory components in telematics unit 220 contain database 228.

Database 228 includes one or more programs 231 for operating telematics unit 220, for example, for operating a vehicle telematics device as a satellite signal receiver. In operation, program 231 executes loaded programs containing instructions and/or received instructions and data in the form of a data stream from a service provider or commands from a user interface (not shown) at data storage 233. In one embodiment, data storage 233 also contains vehicle identification information, such as, for example vehicle account information, caller identification (Caller ID) information, and the like. In another embodiment, Vehicle Identification Number (VIN), ESN, GPS are stored in data storage 233. Program 231 executes the instructions such as, for example, by parsing the data stream/program instructions for additional instructions as well as data and triggers. In one embodiment, program 231 parses the data stream/program instructions and stores triggers at triggers 234. In this embodiment, program 231 transfers data to and receives data from VSM 290 for execution. In an example, program 231 parses the data stream/program instructions and determines current time information, such as, time information of a vehicle power down based on received data from a satellite broadcast system, such as, GPS information.

VSM 290 is any vehicle system control module having software and hardware components for operating, controlling, or monitoring one or more vehicle systems and sensors. In one embodiment, VSM 290 provides location information and is a global positioning system (GPS) module such as, for example, GPS unit 126 of FIG. 1. In another embodiment, VSM 290 is a control module for receiving sensor information and processing the received sensor information.

Vehicle system module 290 contains one or more processors, one or more memory devices, and one or more connection ports. In one embodiment, VSM 290 includes a software switch for scanning received satellite broadcast information, such as, for example GPS information to identify that data has been received. VSM 290 is coupled to vehicle communication network 212 and, therefore, to any other device that is also coupled to vehicle communication network 212. In an example, vehicle communication network 212 is a vehicle communication network 112 as described in FIG. 1, above.

In one embodiment, VSM 290 is directly coupled to telematics unit 220 in primary mobile vehicle 210, for example, vehicle communication network 212 coupling telematics unit 220 to vehicle system module 290. In another embodiment, VSM 290 is indirectly coupled to telematics unit 220.

In operation, when VSM 290 is implemented as a GPS receiver unit, program 291 operating within VSM 290 generates time information based on received GPS information and stores the generated time information at data 292. VSM 290 provides the time information to telematics unit 220 when required.

Satellite broadcast system 246 is any satellite broadcast system enabled for operation as a global positioning system (GPS) provider, such as, for example satellite broadcast system 146 as described with reference to FIG. 1. In one embodiment, satellite broadcast system 246 provides time based GPS information to a vehicle system module implemented as a GPS receiver.

Service provider 270 is any service center providing telematics services such as service center 170 described with reference to FIG. 1. In one embodiment, service provider 270 is enabled to concatenate and otherwise manage database 276 and includes hardware and software for managing database 276 as one or more data tables. In another embodiment, service center 270 is configured to access a database that is in another location but coupled to service center 270 such as, for example, database 166 in web server 160 as described in FIG. 1.

Database 276 contains one or more data tables stored at data storage 273 and trigger event data stored at triggers 274. In one embodiment, database 276 includes one or more programs 231 for managing one or more data tables by, for example, updating the one or more data tables and then providing the updated data tables to a telematics-based system 200 such as MVCS 100 of FIG. 1 above. In an example, trigger event data specifying conditions for providing updated data tables is located in triggers 274.

In illustrative operation, when VSM 290 is implemented as a global positioning system (GPS) module, a trigger within triggers 234 initiates a program within program 231 to generate a vehicle power down signal when the telematics equipped vehicle 210 powers down. In one embodiment, the vehicle power down signal includes vehicle identification information and time information defining the time of the vehicle power down. In an example, VSM 290 provides the time information based on signals received from satellite broadcast system 246. Continuing the illustration, the vehicle power down signal is then communicated to service provider 270. As described in FIG. 3 below, programs 231 within database 276 then initiates a vehicle power down count down and provide an estimated remaining vehicle connection availability window based on the vehicle power down count down to an advisor, such as, for example communication services advisor 178 of FIG. 1.

Figure 3:
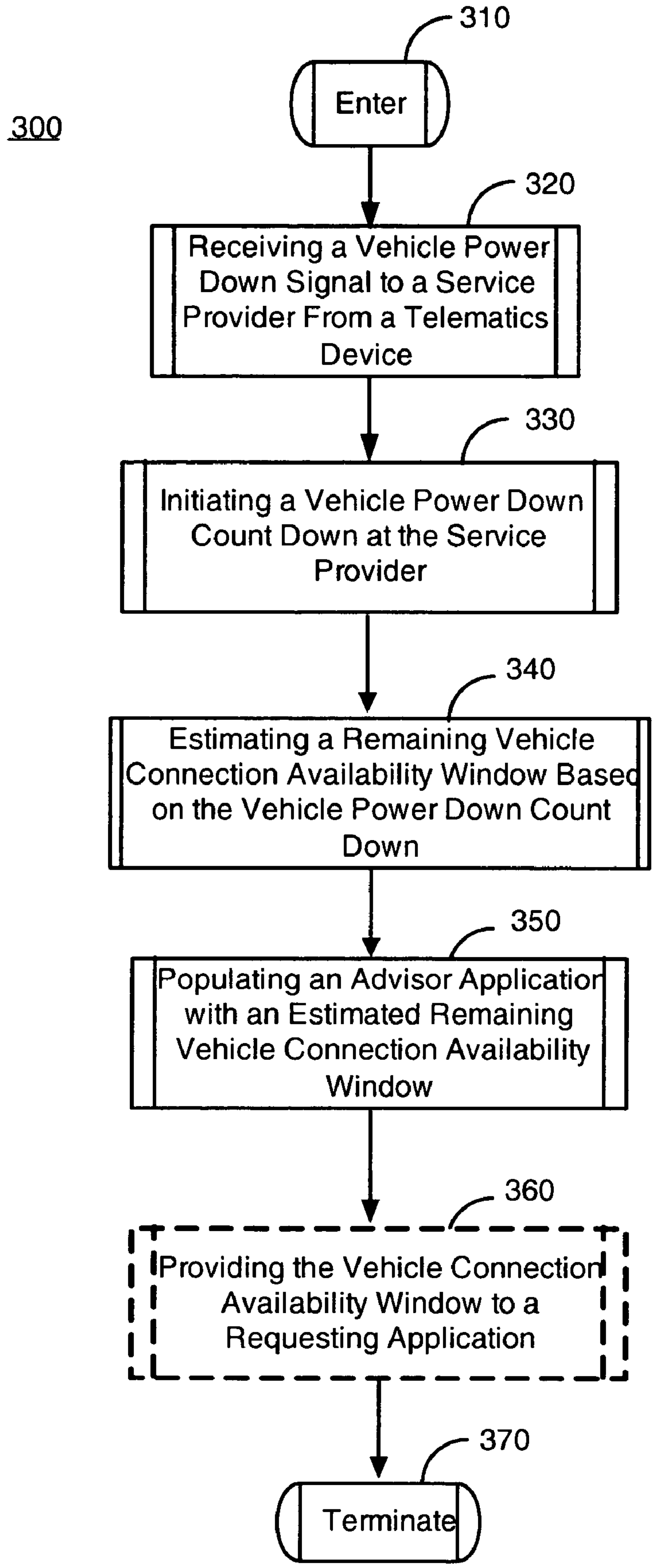
FIG. 3 is a flow diagram of one embodiment of a method of operating a vehicle telematics device, in accordance with the present invention.

FIG. 3 is a flow diagram of one embodiment of a method of providing services within a telematics communication system. In FIG. 3, method 300 may utilize one or more systems and concepts detailed in FIGS. 1 and 2, above. The present invention can also take the form of a computer usable medium including a computer program for providing services within a telematics communication system. The program stored in the computer usable medium includes computer program code for executing the method steps described in FIG. 3. In FIG. 3, method 300 begins at step 310.

At step 320, a vehicle power down signal is received from a telematics device to a service provider. The vehicle power down signal includes vehicle identification information and time information of vehicle power down. In one embodiment, vehicle identification information includes vehicle account information, Caller ID information, VIN, GPS, ESN and the like. In an example and referring to FIG. 2 above, service provider 270 receives a vehicle power down signal from telematics device 220.

In one embodiment, prior to step 320 a vehicle power down signal is generated with the telematics device when a power down mode in an associated motor vehicle is detected and the generated vehicle power down signal is communicated to a service provider. In an example and referring to FIG. 2 above, a vehicle power down signal is generated with the telematics device when a power down mode in an associated motor vehicle is detected when VSM 290 is implemented as a global positioning system (GPS) module and a trigger within triggers 234 initiates a program within program 231 to generate a vehicle power down signal in response to the telematics equipped vehicle 210 entering a power down mode. Examples of power down modes include telematics equipped vehicle 210 entering a stand-by state, telematics equipped vehicle 210 entering a discontinuous receive state, and the like.

At step 330, a vehicle power down count down is initiated at the service provider responsive to the receipt of the vehicle power down signal. In one embodiment, a program within a database initiates a vehicle power down count down when a vehicle power down signal is received to the database. In an example and referring to FIG. 2, program 231 within database 276 initiates a vehicle power down count down when a vehicle power down signal is received to database 276.

At step 340, a remaining vehicle connection availability window is estimated based on the vehicle power down count down. In one embodiment, estimating the remaining vehicle connection availability window based on the vehicle power down count down includes receiving a request for the estimated remaining vehicle connection availability window from a requesting application, producing a remaining vehicle connection availability window responsive to the request, and communicating the produced remaining vehicle connection availability window to the requesting application. In an example and referring to FIG. 2 above, estimating the remaining vehicle connection availability window based on the vehicle power down count down includes program 231 receiving a request for the estimated remaining vehicle connection availability window from an advisor application running within service provider 270. Examples of an advisor application include a real advisor, an automated advisor, and the like. Further to estimating the remaining vehicle connection availability window, program 231 produces a remaining vehicle connection availability window responsive to the request. In this example, program 231 then communicates the produced remaining vehicle connection availability window to the advisor application with service provider 270.

At step 350, a requesting application is populated with an estimated remaining vehicle connection availability window. The estimated remaining vehicle connection availability window is based on the vehicle power down count down and provides an estimate as to the remaining energy within the telematics enabled mobile vehicle. In one embodiment, a data storage location is populated with an estimated remaining vehicle connection availability window. In an example and referring to FIG. 2 above, program 231 populates data storage 273 within database 276 with an estimated remaining vehicle connection availability window.

At optional step 360, the vehicle connection availability window is provided to a requesting application. In one embodiment, the vehicle connection availability window is provided to an advisor. In an example and referring to FIG. 2 above, program 231 populates an advisor application within service provider 270 with an estimated remaining vehicle connection availability window. In another embodiment, optional step 360 further includes providing assistance to a user from the advisor application via a communication device user interface and based on the provided remaining vehicle connection availability window. Examples of the communication device include a telematics device, a cellular telephone, a wireless enabled device, pager, FCC Part 15 enabled devices, key fob, 802.11-enabled device, a land line enabled device, In another embodiment, method 300 further includes the step of requesting time information corresponding to at least one advisor provided assistance event, receiving the requested time information, and producing at least one contact duration value based on the received time information corresponding to the advisor provided assistance event and time information of an associated vehicle power down. In this embodiment, the contact duration value indicates an amount of time between a vehicle power down and an associated advisor provided assistance event. Further to the embodiment, method 300 further includes the step of analyzing the at least one contact duration value, modifying the amount of time that the telematics device is operating in a stand-by state based on the analyzed contact duration values, and modifying the amount of time that the telematics device is operating in a discontinuous receive state based on the analyzed contact duration values.

At step 370, the method is terminated.

In another embodiment, a calculation of remaining battery life occurs after the communication between the telematics unit and call center terminates. The remaining battery life is communicated to at least one vehicle system, in one embodiment. In another embodiment, the remaining battery life is displayed to a user with a display screen.

The above-described methods and implementation for operating a telematics enabled mobile vehicle communication system are example methods and implementations. These methods and implementations illustrate one possible approach for operating a telematics enabled mobile vehicle communication system. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of operating a telematics enabled mobile vehicle communication system, comprising:

receiving a vehicle power down signal from a telematics device to a service provider, the vehicle power down signal including vehicle identification information and time information of vehicle power down;

initiating a vehicle power down count down at the service provider responsive to the receipt of the vehicle power down signal;

estimating a remaining vehicle connection availability window based on the vehicle power down count down; and populating an advisor application with an estimated remaining vehicle connection availability window, the estimated remaining vehicle connection availability window based on the vehicle power down count down.

2. The method of claim 1, further comprising:

generating the vehicle power down signal with the telematics device when a power down mode in an associated motor vehicle is detected, and communicating the generated vehicle power down signal to the service provider.

3. The method of claim 2, wherein the power down mode is selected from the group consisting of: stand-by state and discontinuous receive state.

4. The method of claim 1, wherein the vehicle power down signal includes vehicle identification information selected from the group consisting of: vehicle account information, Caller ID information, GPS location, ESN and a Vehicle Identification Number.

5. The method of claim 1, further comprising:

providing the vehicle connection availability window to an advisor.

6. The method of claim 5, further comprising:

providing assistance to a user via a communication device user interface from the advisor based on the provided remaining vehicle connection availability window.

7. The method of claim 6, further comprising:

requesting time information corresponding to at least one advisor provided assistance events;

receiving the requested time information; and producing at least one contact duration value based on the received time information corresponding to the advisor provided assistance event and time information of an associated vehicle power down, the contact duration value indicating an amount of time between a vehicle power down and an associated advisor provided assistance event.

8. The method of claim 7, further comprising:

analyzing the at least one contact duration value;

modifying the amount of time that the telematics device is operating in a stand-by state based on the analyzed contact duration values; and modifying the amount of time that the telematics device is operating in a discontinuous receive state based on the analyzed contact duration values.

9. The method of claim 1, wherein estimating the remaining vehicle connection availability window based on the vehicle power down count down comprises:

receiving a request for the estimated remaining vehicle connection availability window from the advisor application;

producing the remaining vehicle connection availability window; and communicating the produced remaining vehicle connection availability window to the advisor application.

10. A computer readable medium encoded with a computer program executable by a computer comprising:

computer readable code providing a received vehicle power down signal from a telematics device to a service provider, the vehicle power down signal including vehicle identification information and time information of vehicle power down;

computer readable code initiating a vehicle power down count down at the service provider responsive to the receipt of the vehicle power down signal;

computer readable code estimating a remaining vehicle connection availability window based on the vehicle power down count down; and computer readable code populating an advisor application with an estimated remaining vehicle connection availability window, the estimated remaining vehicle connection availability window based on the vehicle power down count down.

11. The computer readable medium of claim 10, further comprising:

computer readable code generating the vehicle power down signal with the telematics device when a power down mode in an associated motor vehicle is detected, and computer readable code communicating the generated vehicle power down signal to the service provider.

12. The computer readable medium of claim 11, wherein the power down mode is selected from the group consisting of: stand-by state and discontinuous receive state.

13. The computer readable medium of claim 10, wherein the vehicle power down signal includes vehicle identification information selected from the group consisting of: vehicle account information, Caller ID information, GPS location, ESN and a Vehicle Identification Number.

14. The computer readable medium of claim 10, further comprising:

computer readable code providing the vehicle connection availability window to an advisor.

15. The computer readable medium of claim 14, further comprising:

computer readable code providing assistance to a user via a communication device user interface from the advisor based on the provided remaining vehicle connection availability window.

16. The computer readable medium of claim 15, further comprising:

computer readable code requesting time information corresponding to at least one advisor provided assistance events;

computer readable code providing received requested time information; and computer readable code producing at least one contact duration value based on the received time information corresponding to the advisor provided assistance event and time information of an associated vehicle power down, the contact duration value indicating an amount of time between a vehicle power down and an associated advisor provided assistance event.

17. The computer readable medium of claim 16, further comprising:

computer readable code analyzing the at least one contact duration value;

computer readable code modifying the amount of time that the telematics device is operating in a stand-by state based on the analyzed contact duration values; and computer readable code modifying the amount of time that the telematics device is operating in a discontinuous receive state based on the analyzed contact duration values.

18. The computer readable medium of claim 10, wherein the computer readable code for estimating the remaining vehicle connection availability window based on the vehicle power down count down comprises:

computer readable code providing the received estimated remaining vehicle connection availability window from the advisor application;

computer readable code producing the remaining vehicle connection availability window; and computer readable code communicating the produced remaining vehicle connection availability window to the advisor application.

19. A telematics enabled mobile vehicle communication system, comprising:

means for receiving a vehicle power down signal from a telematics device to a service provider, the vehicle power down signal including vehicle identification information and time information of vehicle power down;

means for initiating a vehicle power down count down at the service provider responsive to the receipt of the vehicle power down signal;

means for estimating a remaining vehicle connection availability window based on the vehicle power down count down; and means for populating an advisor application with an estimated remaining vehicle connection availability window, the estimated remaining vehicle connection availability window based on the vehicle power down count down.

* * * * *